Sept. 28, 1954    R. HAUBURSIN    2,690,544
BATTERY TESTER
Filed June 30, 1952

INVENTOR.
RICHARD HAUBURSIN
BY
Willits, Hardman
HIS    ATTORNEYS.

Patented Sept. 28, 1954

2,690,544

UNITED STATES PATENT OFFICE 2,690,544

BATTERY TESTER

Richard Haubursin, Muncie, Ind., assignor to General Motors Corporation, Detroit, Mich., a corporation of Delaware Application June 30, 1952, Serial No. 296,297

8 Claims. (Cl. 339—152)

This invention relates to an improved testing apparatus for storage batteries.

It is among the objects of the present invention to provide testing apparatus for a storage battery, said apparatus consisting of an instrument panel carrying volt and ammeters connected to two portable fixtures which may quickly be applied to the terminal connector posts of a storage battery so that the condition of the battery may readily be indicated by the meters on the panel.

A further object of the present invention is to provide a storage battery testing device of the type aforedescribed wherein the two portable fixtures are made adjustable to be applicable to storage batteries having different spacing of terminal posts and connector straps, each portable fixture having a handle which may be adjusted to suit the operator and thereby facilitate testing of a large number of batteries as they reach the testing station along a production line.

Further objects and advantages of the present invention will be apparent from the following description, reference being had to the accompanying drawing, wherein a preferred embodiment of the present invention is clearly shown.

Figures 1, 2:
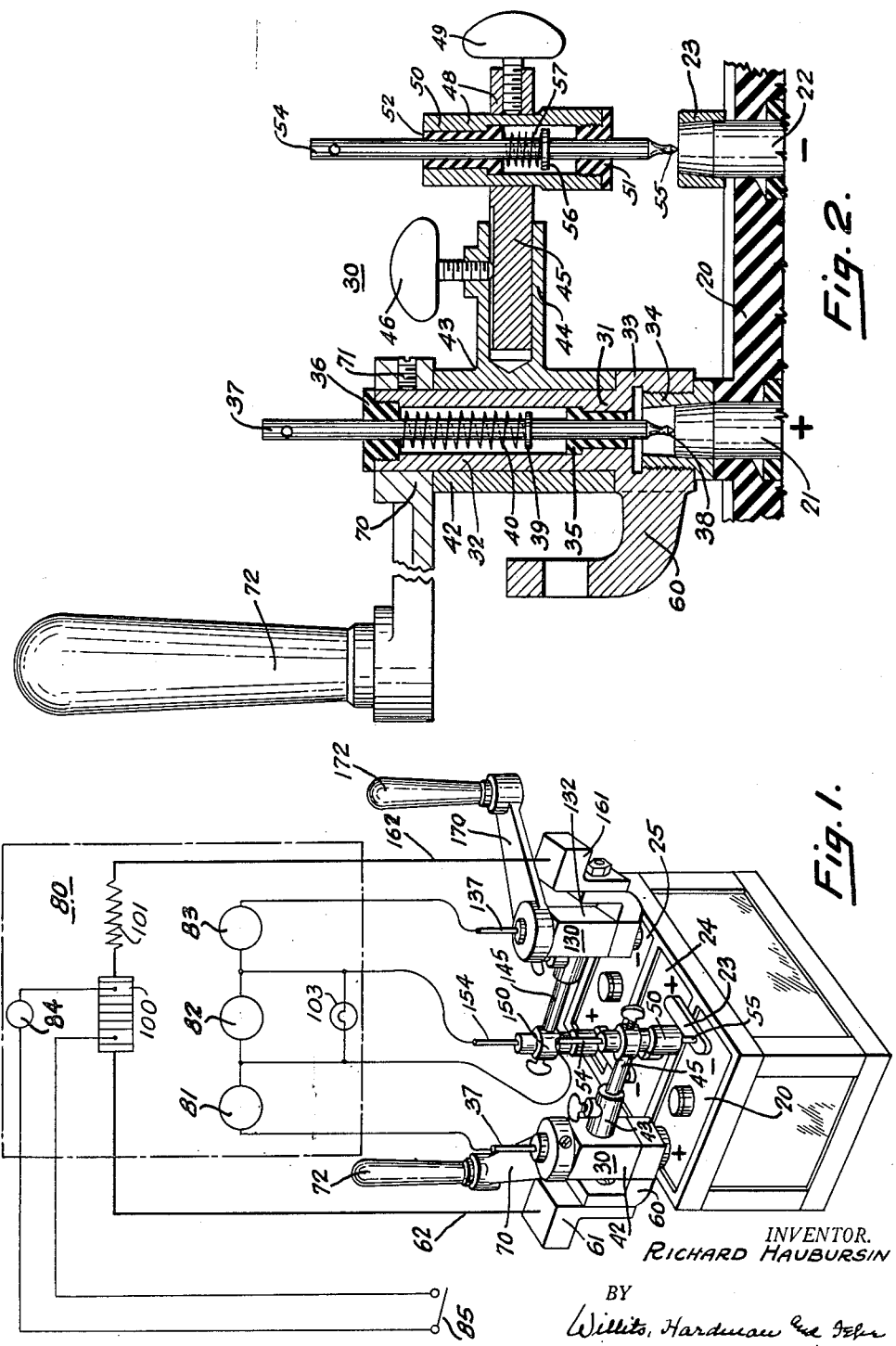
Fig. 1 is a perspective view of the testing apparatus applied to a storage battery, the panel and its meters being shown diagrammatically.
Fig. 2 is a detail, sectional view of one of the portable fixtures of the testing apparatus.

Referring to the drawing, the apparatus for testing storage batteries is shown in Fig. 1, comprising two portable fixtures, one attachable to the terminal post of one cell of a three-cell storage battery, the other fixture being attachable to the terminal of the third cell of the battery. These fixtures, being portable, may be applied to successive storage batteries as they move on the conveyor into the battery testing station. At this station, a stationary panel is provided upon which meters are mounted, these meters being electrically connected with the portable fixtures so that when the fixtures are applied to each battery as it moves into the testing station, a visual indication by the meters shows the condition of the battery being tested.

Fig. 2 of the drawing shows one of these fixtures in sectional detail and applied to two terminal posts of a battery cell. The numeral 20 indicates the battery cell having a positive terminal post 21 tapered at its outer ends, the numeral 22 designating the negative terminal post of this battery cell, this post also being tapered at its outer end. Post 22 has one end of a connector strap 23 attached thereto so as to be in electrical connection therewith, this strap being also electrically connected with the positive post of the middle cell 24 of the storage battery.

The fixtures, being identical, only one will be described detailedly for the sake of brevity. The one fixture designated as a whole by the numeral 30 consists of a standard 31 having a cylindrically shaped body portion 32 and an enlarged head member 33, said head member being recessed and interiorly threaded to receive a nipple 34 provided with a tapered opening therethrough to fit over and embrace a terminal post of a battery cell. In Fig. 2, the post 21 of the cell 20 is shown embraced by and in electrical connection with the nipple 34 of fixture 30. The body portion 32 of the standard is hollow and supports an insulating sleeve 35 within it, an insulating cap 36, centrally apertured, being screwed into the end of said standard opposite the head portion 33. These insulating members 35 and 36, carried by standard 32 and centrally apertured, slidably support a rod 37, the end thereof extending into the nipple 34 being pointed, as at 38, in order that this pointed end of the rod may bite into the end surface of the terminal post upon which the standard is placed. A collar 39 is secured to rod 37 within the standard 32 between elements 35 and 36, this collar 39 forming one abutment against which a spring 40 rests, the other end of the spring engaging the screw cap or member 36. The spring 40 constantly urges the rod 37 toward the sleeve 35 and normally holds the collar 39 in engagement with the insulating sleeve 35. When the standard is placed upon a battery cell so that the nipple 34 in the standard embraces a terminal of the cell, the rod 37 is moved to compress spring 40, said spring exerting a pushing force upon the collar 39 on rod 37 so that the pointed end 38 of said rod bites into and electrically connects the terminal post embraced by the nipple 34 in the standard.

The standard 32 is cylindrical in shape so as to be received by the tubular shaped body portion 42 of the carrier 43, said carrier having a recessed extension 44 for receiving the bracket 45, a thumb screw 46 on the extension 44 being operative to secure the bracket 45 in the selected adjusted position in the carrier 43. The axis of the bracket 45 is substantially at right angles to the axis of the standard 32. Bracket 45 has a ring shaped head portion 48 for receiving another standard 50 tubular in shape, a thumb screw 49 in the bracket holding the standard 50 in the selected adjusted position in the bracket 45. The tubular standard 50 has a centrally apertured insulating cap 51 secured in its one end and centrally apertured insulated collar 52 secured therein adjacent the opposite end of said standard. These two oppositely disposed insulating members 51 and 52 slidably support a contact rod 54, the one end of which is pointed as at 55 in order to be able to bite into and electrically engage a terminal post of a battery cell. Like contactor rod or post 37, this contactor rod 54 has a collar 56 secured thereto between the insulating elements 51 and 52, this collar 56 being engaged by one end of a spring 57, the other end of which engages the insulating collar 52. This spring normally maintains the collar 56 on contactor rod 54 in engagement with the insulating screw cap 51 but is yieldable in order to permit movement of the contactor rod 54 on said standard 50 when the fixture is placed upon the terminal post of a battery cell, the spring 57 exerting pressure to cause the sharpened end 55 of the rod 54 to bite into and electrically engage the terminal post with which said rod aligns. In Fig. 2 the conductor rod 37 is in engagement with the terminal post 21 of the cell 20 and the bracket 45 is so adjusted relatively to carrier 43 on standard 31 that the contactor rod 54 will bite into and electrically engage the other terminal post 22 of the battery cell 20. The contactor rods 37 and 54, being insulated from the standards of the fixture, prevent a circuit between the two terminal posts of the battery cell to be completed through the fixture.

An angular protuberance 60 extends from the head portion 33 of the standard 32 and is adapted to have a terminal 61 secured thereto, said terminal 61 having one end of a conductor 62 connected thereto.

In order to handle the fixture 30 conveniently by any operator a handle bracket 70 is adjustably attached to the standard 32, the handle bracket 70 being immovably secured to said standard in the selected position by a set screw 71. This permits the handle bracket 70 to be set in the most desirable and convenient position relatively to the fixture to suit the individual operator. The handle bracket 70 has a handle 72 attached thereto by means of which the fixture is manipulated by the operator.

The second fixture 130, identical with the fixture just described, is attachable to the terminal post of the other end cell 25 of the battery. It has a standard 132 adapted to be applied to the one terminal post of the cell 25, this standard 132 having the conductor rod 137 extending therefrom. The bracket 145 adjustably secured to standard 132 supports the other standard 150 of this fixture which standard carries the conductor rod 154 adapted electrically to engage the other terminal of this battery cell 25. A connector 161 is attached to the standard 132, this connector 161 having the conductor 162 connected thereto. A handle 172 is attached to the handle bracket 170 which bracket in turn is adjustably secured to the standard 132 in the position selected by the operator.

The aforegoing description relates to the two portable fixtures of the testing apparatus which as heretofore mentioned are connected with electric meters. These meters or indicating devices are all supported by a panel 80 shown in dot-and-dash lines in Fig. 11, the panel being immovably mounted at the station of the battery testing. Three volt meters 81, 82 and 83 and an ammeter 84 are carried by the panel, the ammeter 84 being in circuit with the conductors 62 and 162, the D. C. shunt 100 and the resistor 101, connected to the standard of each of the fixtures. Volt meter 81 is connected across the two contactor posts 37 and 54 of fixture 30 and volt meter 83 is connected across the two contactor posts 137 and 154 of the fixture designated as a whole by the numeral 130. The volt meter 82 is connected between the two volt meters 81 and 83 as is the signal light 103. The circuit, including the ammeter 84, may be controlled by a switch 85 adapted to be closed by the operator when the ampere reading of the battery is desired.

When a storage battery on a conveyor reaches the testing station the operator places the fixtures 30 and 130 in position on the terminals of the respective battery cells 20 and 25. When in position, the nipple 34 of the standard 32 embraces the positive terminal of the cell 20 so that the conductor rod 37 electrically engages said positive terminal 21 of the cell 20 and at the same time the conductor rod 54 of the standard 50 electrically engages the negative terminal of the cell 20. Thus a circuit is established through the volt meter 81 indicating the voltage of the battery cell 20. Having placed the fixture 130 so that the standard 132 thereof fits upon the negative terminal of the cell 25, the contactor 137 of the standard 132 engages said negative terminal, contactor rod 154 will engage the positive terminal of the cell 25. This establishes a circuit through the volt meter 83 to indicate the voltage of the storage battery cell 25. The volt meter 82, connected between the volt meters 81 and 83, will indicate the voltage of the intermediate cell 24 of the battery inasmuch as contactor rod 54, leading to volt meter 82, is in electrical engagement with positive post of cell 24 while the contactor rod 154 connected to the opposite side of the volt meter 82, is also in electrical engagement of the negative post of cell 24, thus meter 82 will indicate the voltage of the intermediate cell 24. By closing the switch 85 to operator completes a circuit through the ammeter from the positive terminal of the battery through wire 62 to the negative terminal post of the battery through the wire 162 and thereby the ammeter 84 will indicate amperage conditions of the entire battery. As soon as satisfactory readings are made, the fixtures 30 and 130 are removed from the battery by the operator, gripping the fixture by the handles 170 and 172, respectively, and the connectors are then applied to the next battery being moved to the testing station by the conveyor.

The fixtures are so constructed that they may be applied to different sizes of batteries. At one time batteries having terminal posts spaced at certain distances may be tested and then other batteries are to be tested whose terminal post spacing is either greater or smaller than that previously tested. By loosening the thumb screw 46 and adjusting the bracket 45 relatively to its carrier 43, the respective fixtures may be adjusted so that the spacing between the conductor rods or posts coincide with the spacing of the terminal posts of the battery to be tested. If another operator uses the apparatus and finds that the position of the handles 72 and 172 are not most conveniently located for him, then he may readjust the position of said handles by loosening the set screws 71 thereof and changing the position of said handles relatively to their respective standard to which they are attached. In case the level of the terminal posts of the cells varies considerably then the standard 59 or 150 of the respective fixtures may be adjusted up or down relative to their supporting brackets by operation of the locking set screw 49.

The testing apparatus of the present invention facilitates commercial production of batteries in large numbers inasmuch as it accelerates the testing process of each battery produced. The present fixture may quickly be applied to the respective batteries, the voltage and amperage conditions of the battery are indicated by meters conveniently located upon a stationary board or panel at the testing station thereby reducing the time required for testing each battery as it is brought to the testing station on the production conveyor.

While the embodiment of the present invention as herein disclosed, constitutes a preferred form, it is to be understood that other forms might be adopted.

What is claimed is as follows:

1. A battery contact device adapted for attachment to a terminal of a battery, comprising, a standard having a recess in one end thereof adapted to fit upon a terminal of a battery for support of the standard thereon, a spring loaded terminal rod slidably supported in said standard and electrically insulated therefrom for spring pressed engagement with the battery terminal on which the standard is placed, a carrier rotatably supported on said standard and including a second standard thereon, and a spring loaded terminal rod slidably supported in said second standard and electrically insulated therefrom and adapted for spring pressed engagement with a second terminal of the battery on which the first standard is supported.

2. A device in accordance with claim 1 in which the carrier includes an arm extending angularly relative to the first carrier and a second arm telescoping upon the first arm for adjustable placement of the second standard on the carrier relative to the first standard.

3. A device in accordance with claim 1 in which said carrier has an opening therein to receive said second standard slidably relative to the carrier, and fastening means operably extending between said carrier and said second standard to fix the position of the second standard relative to the carrier.

4. A battery contact device adapted for attachment to a terminal of a battery, comprising, a standard having a recess in one end thereof adapted to fit upon a terminal of a battery for support of the standard thereon and including an opening through the standard aligned with said recess, a spring loaded terminal rod supported in said opening in said standard and electrically insulated therefrom with the end of said rod projecting into said recess for spring pressed engagement with the battery terminal on which the standard is placed, a carrier supported on said standard for rotation thereon and including a second standard on the said carrier, said second standard having an opening through the same in which there is positioned a second spring loaded terminal rod slidably supported in the said opening and electrically insulated from the second standard with one end of the second terminal rod projecting from one end of the second standard for spring pressed engagement with a second terminal of a battery on which the first standard is supported.

5. A device in accordance with claim 4 in which each of said standards includes electrical insulating bushings slidably supporting said terminal rods in the respective standards.

6. A device in accordance with claim 4 in which electrical insulating bushings are positioned at each end of the openings in each of said standards slidably supporting the said terminal rods in the respective standards, and the springs that spring load the respective terminal rods are positioned within the openings in said standards between the insulating bushings therein, one end of each of the springs engaging an enlargement on the respective terminal rods with the other ends of the springs engaging one of the bushings in the respective standards whereby to spring urge the terminal rods in the respective standards in the same direction of movement.

7. A device in accordance with claim 4 in which the carrier includes an arm projecting angularly therefrom and relative to said first standard, said carrier including a second arm telescoping relative to the first arm and on which said second standard is positioned, said second standard being adjustable relative to said second arm to which the position of the second standard relative to the first standard, relative movement between said arms of said carrier providing for radial adjustment of the second standard relative to the first standard.

8. A device in accordance with claim 4 that includes a handle member mounted on said first standard and positioned at one end of said carrier to retain said carrier on said first standard.

References Cited in the file of this patent

UNITED STATES PATENTS

| Number | Name | Date |
|---|---|---|
| 2,076,639 | Heyer | Apr. 13, 1937 |
| 2,270,554 | Pugh | Jan. 20, 1942 |

FOREIGN PATENTS

| Number | Country | Date |
|---|---|---|
| 541,686 | Great Britain | Dec. 8, 1941 |